(12) United States Patent
Carlson

(10) Patent No.: US 10,637,572 B1
(45) Date of Patent: Apr. 28, 2020

(54) FULL DUPLEX LASER COMMUNICATION TERMINAL ARCHITECTURE WITH RECONFIGURABLE WAVELENGTHS

(71) Applicant: BAE SYSTEMS Information and Electronic Systems Integration Inc., Nashua, NH (US)

(72) Inventor: Robert T. Carlson, New Boston, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/694,082

(22) Filed: Nov. 25, 2019

(51) Int. Cl.
| | |
|---|---|
| *H04B 10/112* | (2013.01) |
| *H04L 5/14* | (2006.01) |
| *G02F 1/13* | (2006.01) |
| *H04J 14/02* | (2006.01) |
| *H04B 10/50* | (2013.01) |

(52) U.S. Cl.
CPC ....... *H04B 10/1125* (2013.01); *G02F 1/1326* (2013.01); *H04B 10/504* (2013.01); *H04J 14/0228* (2013.01); *H04L 5/143* (2013.01)

(58) Field of Classification Search
None
See application file for complete search history.

(56) References Cited

U.S. PATENT DOCUMENTS

| | | | | |
|---|---|---|---|---|
| 3,284,632 | A * | 11/1966 | Niblack | H04B 10/532 398/184 |
| 4,199,226 | A * | 4/1980 | Weber | G01B 11/00 359/260 |

(Continued)

FOREIGN PATENT DOCUMENTS

EP 1054558 A1 * 11/2000 ........... H04N 1/0678

OTHER PUBLICATIONS

Nakata et al., Reconfigurable Terahertz Quarter-Wave Plate for Helicity Switching Based on Babinet Inversion of an Anisotropic Checkerboard Metasurface, Apr. 2019, American Physical Society (Year: 2019).*

*Primary Examiner* — Jai M Lee
(74) *Attorney, Agent, or Firm* — Maine Cernota & Rardin

(57) ABSTRACT

A full duplex dual red/blue wavelength communication architecture and method provides enhanced network configuration flexibility by enabling terminal switching between red and blue configurations, thereby enabling wavelength reconfiguration within the network on command while the terminal is in the field, airborne, or on orbit. A transmit laser module includes separate "red" and "blue" linear polarized lasers, or a single linear polarized laser tunable from red to blue. The transmit/receive diplexer uses a linear polarized beam splitter and a waveplate to transition the output beam between left and right circular polarization without affecting precision pointing, or co-boresight transmit/receive alignment. Waveplate polarization can be switched by physical rotation, or electrically using a liquid crystal variable retarder (LCVR). Red and blue bandpass filters can be selected in the receiver and/or transmitter by physical manipulation, optical switches, DWDM 3-port filters, and/or LCVRs. Two-laser embodiments can include a retroreflector for receiver optics self-calibration.

21 Claims, 7 Drawing Sheets

(56) References Cited

U.S. PATENT DOCUMENTS

| | | | | |
|---|---|---|---|---|
| 4,901,728 | A * | 2/1990 | Hutchison | A61B 5/14558 356/368 |
| 5,099,147 | A * | 3/1992 | Gregor | H01S 3/30 359/327 |
| 5,212,594 | A * | 5/1993 | Joynes | G02B 6/3604 359/485.05 |
| 5,530,577 | A * | 6/1996 | Orino | H04B 10/1125 398/129 |
| 5,710,652 | A * | 1/1998 | Bloom | H04B 10/118 398/129 |
| 6,310,707 | B1 * | 10/2001 | Kawase | H03C 7/04 398/119 |
| 6,327,063 | B1 * | 12/2001 | Rockwell | H04B 10/118 398/122 |
| 6,330,092 | B1 * | 12/2001 | Aronson | H04B 10/11 398/119 |
| 6,414,773 | B1 * | 7/2002 | Masuzawa | H04B 10/1141 398/152 |
| 6,441,938 | B1 * | 8/2002 | Heflinger | H04B 10/25751 398/152 |
| 7,277,641 | B1 * | 10/2007 | Gleckman | H04B 10/118 398/128 |
| 8,417,126 | B2 * | 4/2013 | Mandai | H04J 14/06 398/152 |
| 10,158,427 | B2 | 12/2018 | Carlson | |
| 10,331,008 | B1 * | 6/2019 | Tam | G02F 1/29 |
| 2001/0003442 | A1 * | 6/2001 | Smith | H04B 7/10 342/365 |
| 2001/0043379 | A1 * | 11/2001 | Bloom | H04B 10/1125 398/128 |
| 2004/0081466 | A1 * | 4/2004 | Walther | H04B 10/1143 398/152 |
| 2006/0088074 | A1 * | 4/2006 | Johnstone | H01S 3/2383 372/70 |
| 2008/0219579 | A1 * | 9/2008 | Aksyuk | G02B 26/06 382/248 |
| 2009/0237662 | A1 * | 9/2009 | Chang | G01J 4/04 356/364 |
| 2009/0257755 | A1 * | 10/2009 | Buelow | H04B 10/505 398/184 |
| 2011/0181881 | A1 * | 7/2011 | Mathur | G01N 21/21 356/342 |
| 2012/0087500 | A1 * | 4/2012 | Ukita | H04L 9/0858 380/256 |
| 2012/0128374 | A1 * | 5/2012 | Yang | H04B 10/116 398/184 |
| 2012/0315043 | A1 * | 12/2012 | Nakagawa | G02F 1/0136 398/65 |
| 2014/0241729 | A1 * | 8/2014 | Brooks | H04B 10/1121 398/115 |
| 2016/0013882 | A1 * | 1/2016 | Hashimoto | H04B 10/118 398/65 |
| 2017/0055051 | A1 * | 2/2017 | Mao | H04B 10/25 |
| 2017/0310084 | A1 * | 10/2017 | Kim | H01S 5/0687 |
| 2017/0346564 | A1 * | 11/2017 | Wiswell | H04B 10/118 |
| 2018/0191446 | A1 * | 7/2018 | Blanks | G02B 27/4244 |
| 2019/0052045 | A1 * | 2/2019 | Metzger | G01J 9/02 |

* cited by examiner

FULL DUPLEX LASER COMMUNICATION TERMINAL ARCHITECTURE WITH RECONFIGURABLE WAVELENGTHS

FIELD OF THE DISCLOSURE

The invention relates to wireless communications, and more particularly, to wireless laser communications.

BACKGROUND

Due to an explosion in both civilian and military wireless communication, there is a growing need for high speed, reliable, secure, wireless communication of large amounts of data between communicating nodes. Traditional communication by wireless radio frequencies suffers from several shortcomings, including rapid attenuation of signal strengths with distance and limited available communication bands. In addition, radio signals can be easily intercepted by unintended and sometimes hostile receivers. Furthermore, it is relatively easy for hostile antagonists to attempt to jam radio communications by transmitting radio signals at high energies that blanket a region of interest.

Laser communication offers an attractive wireless alternative to radio communication, especially when point-to-point communication is required, because the non-dispersed, focused character of laser communication intrinsically avoids most of the problems that are associated with radio communication. Laser communication eliminates the need for frequency planning and authorization, and circumvents the highly congested RF spectrum bandwidth constraints that limit the practical data rates available to users of RF links. Laser signals also experience very little attenuation as a function of distance, because the signal energy remains tightly contained in a beam from a diffraction-limited optical aperture with exceptionally low divergence. Also, laser communication security is intrinsically high, because interception of and interference with laser communications requires direct interception of a laser communication beam, and/or focusing jamming beams directly at an intended signal receiver.

One important application that can benefit significantly from laser communication is satellite communications, where line-of-sight access is generally available, and where the communication distances are very great. Global laser communication can be realized by forming a laser communication network among a plurality of satellites. Laser communication can provide data rate communications for satellites that are much higher than radio data rates, with unmatched anti-jam characteristics and an inherently low risk of communications intercept.

Nevertheless, while much of the present disclosure is presented in the context of satellite laser communication, it will be understood by those of skill in the art that the present disclosure is not limited to satellite communication, but also applies to other implementations of laser communication.

Full duplex (simultaneous, bi-directional) laser communication can be implemented between terminals in a laser communication network to maximize the network connectivity and bandwidth, and minimize handshake overhead. Typically, two laser wavelengths are implemented in the network, whereby each satellite transmits on one of the two wavelengths and receives on the other. The two implemented wavelengths can generally be referred to as a "first" wavelength and a "second" wavelength. However, for simplicity of expression, the two wavelengths that are implemented in a full duplex laser communication network are sometimes referred to herein as "red" and "blue," although any two wavelengths can be selected, including wavelengths that are not within the visible spectrum. The two wavelengths are typically selected such that the receive channel can be isolated from the transmit channel by a factor of 60 to 100 dB or more.

Typically, each of the terminals that form a laser communication link is either a "red" terminal, in that it is equipped with a "red" message transmitting laser, or it is a "blue" terminal, in that it is equipped with a "blue" message transmitting laser, and the terminals are configured such that "red" satellites are placed into direct communication with "blue" satellites, and vice versa, thereby enabling full duplex communication. Of course, the receivers in the "red" satellites include filters and/or other components that are configured to direct received "blue" laser light to the detector of the receive channel, while excluding any other wavelengths from reaching the detector, and the receivers in the "blue" satellites include similar components that allow only "red" laser light to reach the detector.

Laser communication requires that precision pointing and alignment between the optics of two communicating terminals be established and maintained. This can be challenging, especially when the terminals are separated by a great distance. Generally, one or both terminals transmits an alignment "beacon" that is slightly dispersed in its focus, so that it can be detected by the other terminal. Typically, each beacon is transmitted at a wavelength that is neither the "red" nor the "blue" wavelength. The beacons are used both for initial alignment during an "acquisition phase," and sometimes also, with reduced power and tighter focus, for maintaining alignment during data communication ("communication phase"). This use of beacons to establish precise alignment allows precision pointing of the much narrower "red" and "blue" communication beams, thereby reducing power consumption while significantly enhancing the signal-to-background ratio and ensuring high speed, accurate communication. Once alignment has been established, the beacon power and angular divergence can be reduced, thereby freeing power to be redirected to the communication lasers.

In addition to establishing alignment between the optics of two satellites or other laser terminals, it is also necessary that the "red" and "blue" optics, i.e. the transmit and receive optics, of each terminal remain aligned with each other, i.e. "co-boresight alignment," despite any thermal stresses and other factors that might tend to cause a relative misalignment. Periodic calibration and adjustment of this mutual alignment of the transmit/receive optics generally requires the cooperation of a remote terminal as a calibration source. As an alternative, it can be necessary to include additional apparatus in the terminal to enable implementation of a terminal self-contained transmit/receive boresight alignment function.

Furthermore, the fixed configuration of each terminal as being either a "red" terminal or a "blue" terminal limits the flexibility to reconfigure the laser communication network in response to any disruption, for example if one of the terminals should fail due to a malfunction or a malicious attack.

What is needed, therefore, is a laser communication terminal architecture and method with increased flexibility for reconfiguration of the terminals within a laser communication network. Preferably, the improved architecture and method should also enable mutual alignment of the transmit and receive optics of the terminal without requiring the cooperation of a second terminal as a calibration reference.

SUMMARY

The present disclosure is a laser communication terminal architecture and method having increased flexibility for reconfiguration of the terminal within a laser communication network, in that the configuration of a terminal that implements the disclosed architecture can be transitioned as needed, between configuration as a "red" terminal and configuration as a "blue" terminal. Embodiments are applicable to satellite terminals, ground terminals, and airborne terminals in flight that implement an ad-hoc airborne network configuration. Embodiments implemented in satellite terminals enable transitioning between red and blue configurations on-orbit. Embodiments further enable mutual co-boresight pointing alignment of the transmit and receive optics of the terminal without requiring the cooperation of a second remote terminal as a calibration reference.

According to the present disclosure, each terminal that implements the disclosed laser communication architecture includes a laser transmit module that is able to transition between transmitting communications on either of two laser wavelengths, referred to herein as the "red" laser wavelength and the "blue" laser wavelength, although the two lasers can have any two wavelengths that can be isolated from each other, and need not be within the visible spectrum. In embodiments, the two laser wavelengths are selected to enable a transmit/receive isolation of 60 to 100 dB or more. For example, in embodiments the separation between the red and blue wavelengths is between 2.4 nm and 15 nm, i.e. 300 GHz to 1875 GHz separation in the 1550 nm spectral region.

The disclosed architecture further includes a controller that directs the terminal to transmit communications at one of the red and blue wavelengths, while the receive channel is tuned to the other of the two wavelengths.

In some embodiments, the laser transmit module includes two separate communication lasers that are tuned to the red and blue wavelengths, respectively. In some of these embodiments the two laser outputs are directed to a combiner, and the controller causes only one of the lasers to be driven, thereby selecting whether the terminal will transmit a red or blue communication beam. In similar embodiments, the outputs of the two lasers are directed to inputs of a laser selector that is used to select one of the two outputs, thereby selecting whether the terminal will transmit a red or blue message beam.

In other embodiments, the laser transmit module includes a single communication laser that can be tuned between the red and blue wavelengths. For example, embodiments implement tunable lasers similar to the lasers that are used for Dense Wave Division Multiplexing, as specified by the International Telecommunication union ("ITU-DWDM"). In an exemplary embodiment, for example, the blue laser wavelength is Channel #33 at 1550.92 nm, and the Red laser wavelength is Channel #30 at 1553.33 nm, thereby providing a separation of 2.4 nm between the red and blue wavelengths.

After the output of the laser transmit module has been modulated by a modulator, the transmit output power is boosted by a high power optical amplifier (HPOA). In addition to amplifying the output power at the transmit wavelength, the HPOA can also result in amplified spontaneous emission (ASE) noise at the receive wavelength. Therefore, after the HPOA embodiments include selectable "red" and "blue" filters in the transmit path that can be selected to block the undesired HPOA ASE receive wavelength emissions that could otherwise cause scattered light problems in the receiver.

The transmit laser or lasers that are included in the transmit laser module are configured to emit linearly polarized beams. This enables the present architecture to implement a linear polarization beam splitter as part of the transmit/receive diplexer. The diplexer further includes a polarization retarder (i.e. waveplate) in the common input-output path that is rotationally or electrically switchable to convert the linear polarized transmit light that passes through the beam splitter into either a right circular polarized beam or a left circular polarized beam that propagates through free space between red and blue terminals. Similarly, circularly polarized communication light that is received by the terminal is converted by the waveplate into linear polarized light before it reaches the beam splitter. According to the disclosed method, when the terminal is switched between being configured as a red terminal and being configured as a blue terminal, the polarization waveplate is switched so as to impose circular polarization in opposite directions onto "red" and "blue" transmitted laser light.

Accordingly, for example, if a terminal is configured as a red terminal whereby vertically polarized red laser light is reflected by a horizontally polarized beam splitter, and is subsequently converted by the waveplate into right circularly polarized light, then communications will be received as left circularly polarized light at the blue wavelength, which will be converted into horizontally polarized blue light by the waveplate, and then will propagate through the beam splitter and into the receiver.

The diplexing function of the disclosed architecture is therefore implemented entirely by controlling the polarizations of the transmitted and received beams, without relying on bandpass filters, in contrast with the more common dichroic approach of implementing the Tx-Rx diplexer using bandpass filter(s). The present approach thereby allows the terminal diplexer to be easily switched between receiving "red" and "blue" light while receiving blue and red light, respectively, simply by reversing the circular polarization that is imposed by the waveplate, without affecting the precision pointing or the co-boresight alignment between transmit and receive.

In embodiments, the waveplate is a half-wave plate, and the direction of the circular polarization is selected by mechanical rotation of the half-wave plate, for example using a stepper motor. In other embodiments, the circular polarization direction is selected electrically using a liquid crystal variable retarder (LCVR) that has no moving parts as the waveplate.

Various embodiments include optical bandpass filter assemblies in the receiver that further minimize entry of any extraneous light into the receive channel. In embodiments, each bandpass filter assembly includes a "red" bandpass filter and a "blue" bandpass filter arranged in parallel and configured so that either bandpass filter can be inserted into the receiver beam path. In embodiments, the receiver further implements a spatial acquisition tracking module in which a bandpass filter assembly includes a "no-filter" channel that can be selected in lieu of the red or blue bandpass filter, so as to allow all light wavelengths to enter the receiver. For example, in embodiments the no-filter channel enables a spatial acquisition receiver such as a focal plane array to accept broadband light from a star so as to obtain a celestial navigation fix for the attitude of the terminal.

In embodiments, the filters of the bandpass filter assemblies are selectable by physically moving them into and out of beam paths of the receiver, for example via a mechanical switch, via a two-position or three-position tilt rotation, via stepper motor rotation or linear translation, or via bi-static rotary solenoids. In other embodiments, the filters are selectable via a pair of 2×1 or 3×1 switches or by 2×1 or 3×1 fiber couplers.

In still other embodiments the filter assemblies implement 3-port DWDM (Dense Wavelength Division Multiplexing) fiber optic filters. And in yet other embodiments, the receiver implements parallel beam paths that include red and blue filters respectively, and the received light is switched between the paths using, for example, a 2×1 switch or polarizing beam splitters in combination with LCVR(s) to select the desired filter path.

Accordingly, the disclosed architecture enables a terminal in a laser communication network to be switched between being a "red" terminal and being a "blue" terminal, thereby providing greater flexibility in reconfiguring a laser communication network, for example in response to any disruption, such as if one of the nodes should fail due to a malfunction or a malicious attack.

With reference to FIG. 4, some embodiments that include separate red 102 and blue 104 lasers further implement a self co-boresight alignment functionality by including an external retroreflector 400 with optional attenuator 402 and/or waveplate 404 attached thereto, whereby, for example, when the terminal is configured as a "blue" terminal, transmitted light from the red laser 102 can be retro-reflected into the receiver channel 114 for alignment of the receiver optics, and vice versa.

A first general aspect of the present disclosure is a laser communication terminal that includes a transmit laser module that is configured to be transitioned between emitting linearly polarized transmit laser light at a first laser wavelength and emitting linearly polarized transmit laser light at a second laser wavelength, a communication modulator configured to modulate the transmit laser light so as to encode communication data thereupon, a controller, configured during a communication phase to cause the transmit laser light to be emitted by the transmit laser module at the first laser wavelength when the laser communication terminal is in a first terminal configuration, and to cause the transmit laser light to be emitted by the transmit laser module at the second laser wavelength when the laser communication terminal is in a second terminal configuration, a receiver configured to receive laser light from a receiving input of the laser communication terminal and to direct the received laser light to a detector, and a transmit-receive polarization diplexer. The transmit-receive polarization diplexer includes a beam splitter having a linear polarization that is oriented so as to direct the linear polarized transmit laser light to a transmitting output of the terminal, and a waveplate configured to convert the linear polarized transmit laser light into circularly polarized laser light, the waveplate being configured when the laser communication terminal is in the first terminal configuration to convert the linearly polarized transmit laser light into right circularly polarized transmit laser light, the waveplate being reconfigurable when the laser communication terminal is in the second terminal configuration so as to convert the linearly polarized transmit laser light into left circularly polarized transmit laser light. The diplexer is configured to direct the received laser light from the receiving input to the receiver when the received laser light has a circular polarization that is opposite to the circularly polarized transmit laser light.

In embodiments, the transmit laser module comprises a first laser configured to emit the linearly polarized transmit laser light at the first laser wavelength, and a second laser configured to emit the linearly polarized transmit laser light at the second laser wavelength. In some of these embodiments, the linearly polarized transmit laser light emitted by the first and second lasers is directed to first and second inputs respectively of a laser selector, the laser selector being configured during the communication phase to select the linearly polarized transmit laser light from one of its inputs and to direct the selected linearly polarized transmit laser light to the communication modulator. In some of these embodiments the laser selector includes a 2:1 laser switch.

Any of the embodiments that include a first laser configured to emit the linearly polarized transmit laser light at the first laser wavelength, and a second laser configured to emit the linearly polarized transmit laser light at the second laser wavelength can further include a self-calibration functionality that includes an external retroreflector, the self-calibration functionality being configured when the terminal is in the first terminal configuration to enable the linearly polarized transmit laser light from the second laser to be directed through the diplexer and into the receiver, the self-calibration functionality being configured when the terminal is in the second terminal configuration to enable the linearly polarized transmit laser light from the first laser to be directed through the diplexer and into the receiver, the self-calibration functionality thereby enabling mutual co-boresight pointing alignment of transmit and receive optics of the terminal.

In other embodiments, the transmit laser module includes a laser that is tunable between the first laser wavelength and the second laser wavelength.

Any of the above embodiments can further include a high power optical amplifier (HPOA) configured to amplify the linearly polarized transmit laser light. Some of these embodiments further include a transmit optical bandpass filter assembly configured to filter the linearly polarized transmit laser light after it is amplified by the HPOA.

In any of the above embodiments, the waveplate can be mechanically rotatable to switch between converting the linearly polarized transmit laser light into right circular polarized transmit laser light and left circular polarized transmit laser light. In some of these embodiments, a stepper motor is configured to rotate the waveplate.

In any of the above embodiments, the waveplate can be a liquid crystal variable retarder (LCVR) that is configured to be electrically switched between converting the linearly polarized transmit laser light into right circular polarized transmit laser light and left circular polarized transmit laser light.

In any of the above embodiments, the receiver can further include at least one optical bandpass filter assembly that is switchable between a first filter assembly mode in which the second laser wavelength is able to pass through the filter assembly while other wavelengths are excluded, and a second filter assembly mode in which the first laser wavelength is able to pass through the filter assembly while other wavelengths are excluded. In some of these embodiments the optical bandpass filter assembly includes a first filter channel configured to allow the first laser wavelength to pass through the first filter channel with minimal attenuation while other wavelengths are excluded, and a second filter channel configured to allow the second laser wavelength to pass through the second filter channel with minimal attenuation while other wavelengths are excluded, the first and second filter channels being arranged in parallel and configured so that either filter channel can be inserted into a receiver beam path of the receiver. In any these embodiments the filter channels of the optical bandpass filter assembly can be insertable into the receiver beam path of the receiver by physically moving them into and out of the beam path of the receiver. In any of these embodiments each of the filter channels of the bandpass filter assembly can be physically movable into and out of the beam path of the receiver by at least one of mechanical switching, two-position or three-position tilt rotation, rotation or linear translation by a stepper motor, and rotation by a bi-static rotary solenoid. In any of these embodiments, the first and second filter channels of the bandpass filter assembly can be selectable by controlling at least one of a pair of 2×1 switches, a pair of 2×1 fiber couplers, and a 2×1 switch configured to select a desired output from a pair of 3-port DWDM (Dense Wavelength Division Multiplexing) fiber optic filters.

In any of the above embodiments, the receiver can further include a spatial acquisition tracking module that implements a spatial acquisition filter assembly, wherein the spatial acquisition filter assembly includes a first acquisition filter channel configured to allow the first laser wavelength to pass through the first acquisition filter channel with minimal attenuation while other wavelengths are excluded a second acquisition filter channel configured to allow the second laser wavelength to pass through the second acquisition filter channel with minimal attenuation while other wavelengths are excluded, and a no-filter channel that is configured to allow all light wavelengths to pass therethrough with minimal attenuation.

In any of the above embodiments, the receiver can include two parallel beam paths, which are a first beam path having included therein a first filter configured to allow the first laser wavelength to pass therethrough with minimal attenuation while other wavelengths are excluded, and a second beam path having included therein a second filter configured to allow the second laser wavelength to pass therethrough with minimal attenuation while other wavelengths are excluded. In some of these embodiments the received light can be switched between the beam paths by at least one of a 2×1 switch, a 2×1 fiber coupler, and a polarizing beam splitter in combination with an liquid crystal variable retarder (LCVR) configured to direct the received light to a selected beam path according to its polarization.

A second general aspect of the present disclosure is a method of controlling a laser communication terminal. The method includes providing a laser communication terminal according to the first general aspect, placing the laser communication terminal in the first terminal configuration, whereby linearly polarized transmit laser light is emitted by the transmit laser module at the first laser wavelength, and the waveplate converts the linearly polarized transmit laser light into right circularly polarized transmit light, and placing the laser communication terminal in the second terminal configuration, whereby the linearly polarized transmit laser light is emitted by the transmit laser module at the second laser wavelength, and the waveplate converts the linearly polarized transmit laser light into left circularly polarized transmit light.

In embodiments, the receiver comprises an optical bandpass filter assembly; placing the laser communication terminal in the first terminal configuration further comprises configuring the optical bandpass filter assembly to allow light having the second laser wavelength to pass through the optical bandpass filter assembly while other wavelengths are excluded; and placing the laser communication terminal in the second terminal configuration further includes configuring the optical bandpass filter assembly to allow light having the first laser wavelength to pass through the optical bandpass filter assembly while other wavelengths are excluded.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a laser communication terminal architecture and method having increased flexibility for reconfiguration of the terminal within a laser communication network, in that the configuration of a terminal that implements the disclosed architecture can be switched between being configured as a "red" terminal and being configured as a "blue" terminal. Embodiments further enable co-boresight alignment of the transmit and receive optics of terminals that implement the disclosed architecture without requiring the cooperation of a second terminal as a calibration reference.

Figure 1A:
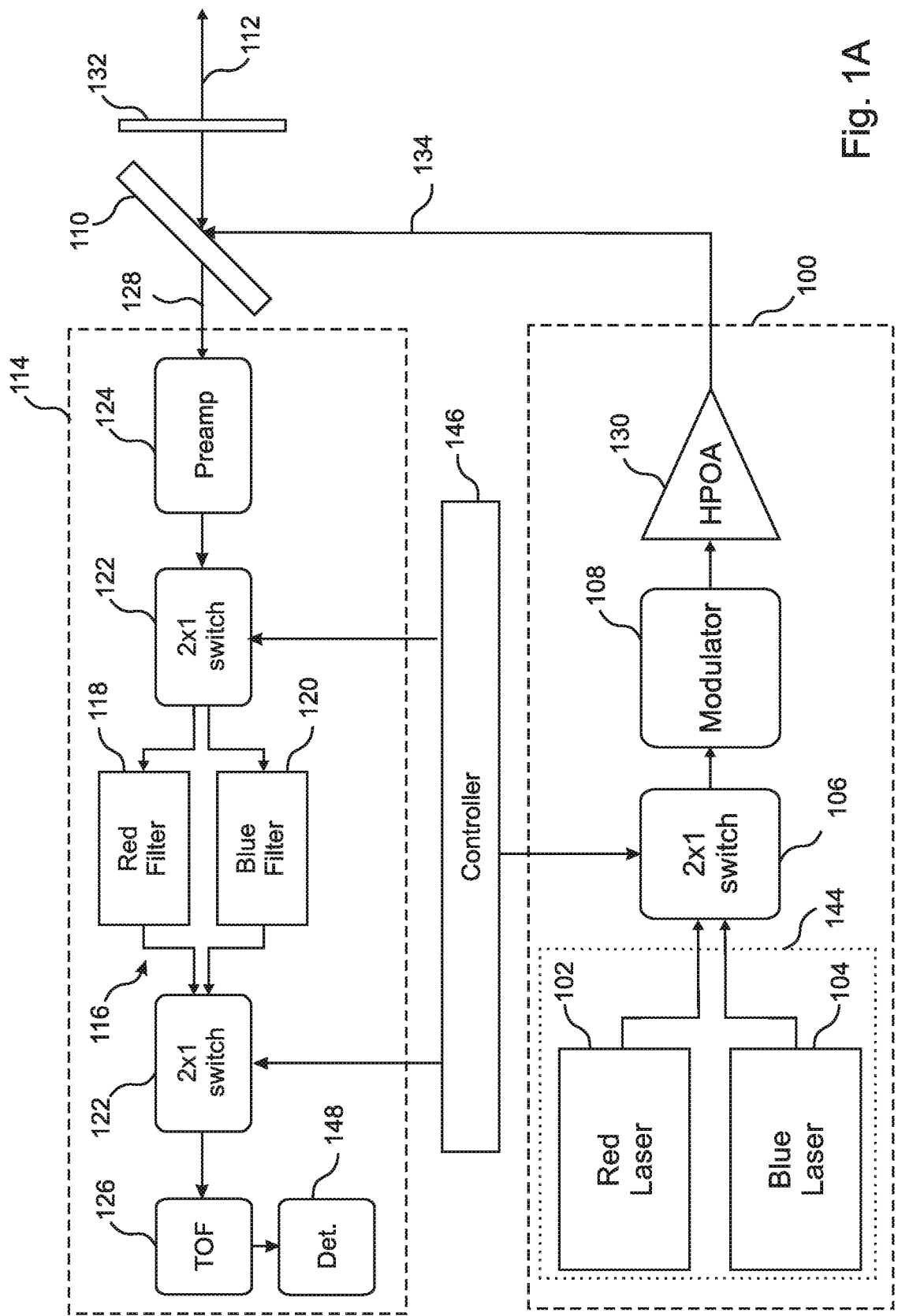
FIG. 1A is block diagram of an embodiment of the present disclosure having a transmit laser module that includes separate red and blue transmit lasers.

With reference to FIG. 1A, the presently disclosed architecture includes a transmitter 100 that can be transitioned between transmitting communications at either of two selected wavelengths, which are referred to herein as the "red" wavelength and the "blue" wavelength, although the two selected wavelengths can be any two wavelengths that can be isolated from each other, and need not even be within the visible spectrum. In embodiments, the two laser wavelengths are selected to enable a transmit/receive isolation of 60 to 100 dB or more. For example, in embodiments the separation between the red and blue wavelengths is between 2.4 nm and 15 nm, i.e. 300 GHz to 1875 GHz separation in the 1550 nm spectral region.

The disclosed architecture further includes a receiver 114 that can be cooperatively transitioned to receive communications at the other of the red and blue wavelengths, as well as a controller 146 that directs the transmitter 100 to select either the red or the blue wavelength for transmission, while instructing the receive channel 114 to receive communications at the other of the two wavelengths.

Figure 1B:
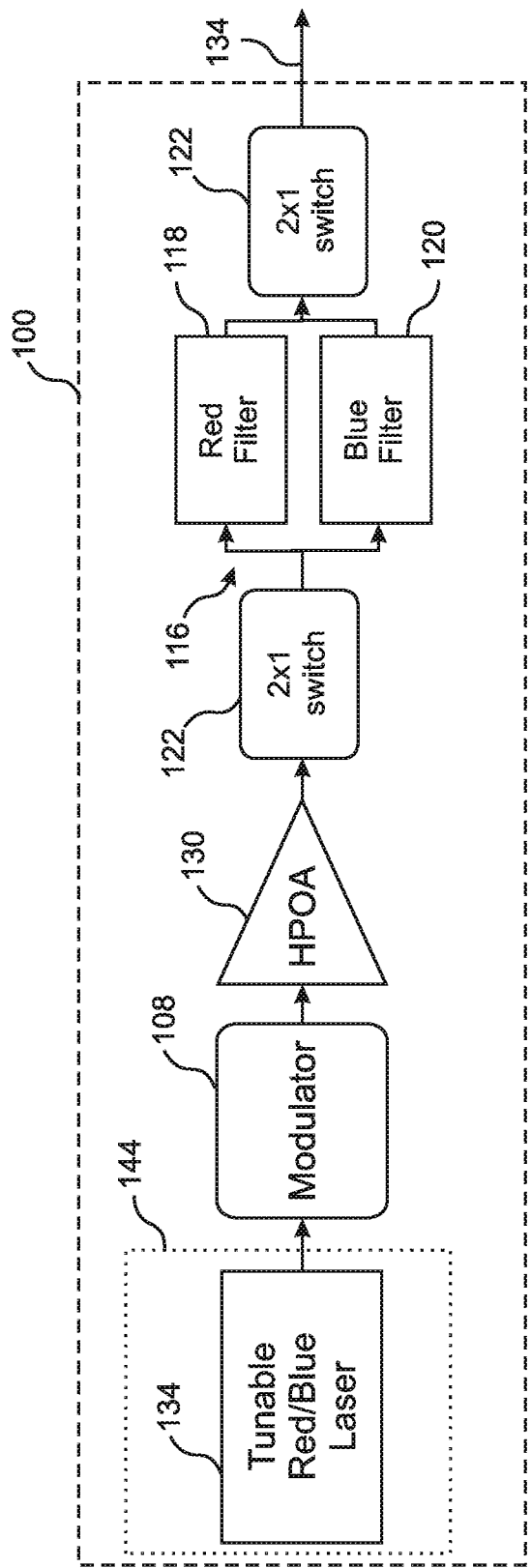
FIG. 1B is a block diagram that illustrates a transmitter in an embodiment wherein the transmit laser module includes only one transmit laser that is tunable between the red and blue wavelengths.

The transmitter 100 of the disclosed laser communication architecture comprises a "transmit laser module" 144. In the embodiment of FIG. 1A, the transmit laser module 144 includes two laser communication transmission lasers 102, 104, referred to herein as the "red" laser 102 and the "blue" laser 104. With reference to FIG. 1B, in other embodiments the transmit laser module 144 includes only a single communication transmission laser 134 that can be tuned between the red and blue wavelengths.

After the output of the transmit laser module 144 has been modulated by a modulator 108, its power is boosted by a high power optical amplifier (HPOA) 130. In addition to amplifying the output power at the selected red or blue transmit wavelength, the HPOA 130 can also emit amplified spontaneous emission (ASE) noise at the other of the red and blue wavelengths, i.e. at the receive wavelength. Therefore, as is illustrated in FIG. 1B, after the HPOA embodiments further include selectable "red" and "blue" filters that can be inserted into the transmit path to block the undesired HPOA ASE receive wavelength emissions, which could otherwise introduce scattered light as additional noise in the receiver 114.

In some embodiments where the transmit laser module 144 includes two lasers 102, 104, the laser outputs of the two lasers 102, 104 are directed to a combiner, and the controller 146 causes only one of the lasers 102, 104 to be driven, thereby selecting whether the transmit laser module 144 will emit a red or blue communication beam. In other embodiments, the outputs of the two lasers 102, 104 are directed to inputs of a laser selector that is used to select one of the two transmit outputs, thereby selecting whether the laser transmit module 144 will emit a red or blue communication beam. In the embodiment of FIG. 1A, the selection between the red and blue lasers 102, 104 is made by a 2×1 switch 106.

The transmit laser 134 or lasers 102, 104 that is/are included in the transmit laser module 144 are configured to emit linearly polarized beams. This enables the present architecture to implement a linear polarization beam splitter 110 as part of the transmit/receive diplexer. The diplexer further includes a polarization retarder (i.e. waveplate) 132 that is rotationally or electrically switchable to convert the linear polarized light from the beam splitter 110 into either right or left circular polarization, and to convert received light that is circularly polarized back into liner polarized light. According to the disclosed method, when the terminal is switched between being configured as a red terminal and being configured as a blue terminal, the polarization waveplate 132 is switched so as to impose circular polarization in opposite directions onto "red" and "blue" transmitted laser light.

Figure 1C:
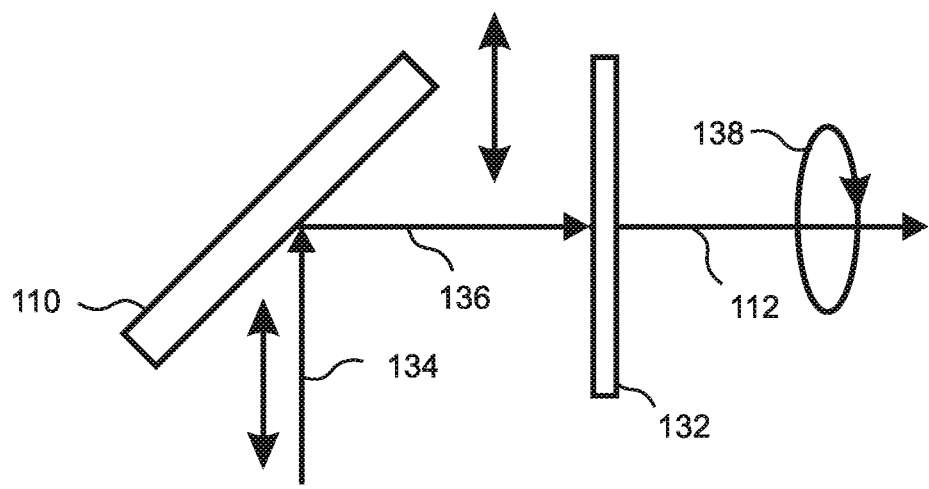
FIG. 1C is a block diagram that illustrates the interaction between transmitted laser light and the beam splitter and waveplate in an embodiment of the present disclosure.
Figure 1D:
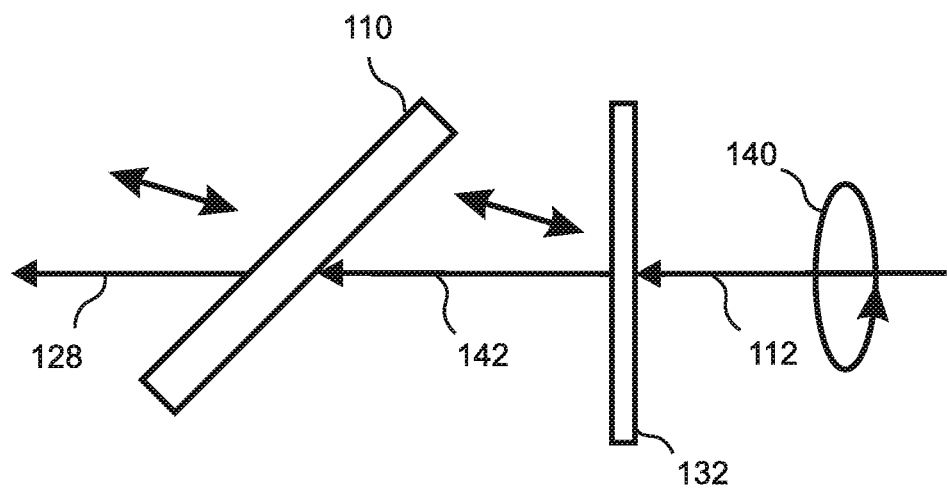
FIG. 1D is a block diagram that illustrates the interaction between received laser light and the beam splitter and waveplate in an embodiment of the present disclosure.

For example, with reference to FIG. 1C, if the lasers 102, 104 of the transmit laser module 144 of FIG. 1A are configured to emit vertically polarized light, then the beam splitter 110 will be horizontally polarized. If the red laser 102 is selected, then the vertically polarized light 134 from the red laser 102 will be reflected by the polarized beam splitter 110 and the resulting beam 136 will then be converted by the waveplate 132 into an output beam 112 that is right circularly polarized 138 (according to the illustrated example). With reference to FIG. 1D, communications 112 will be received according to this example as left circularly polarized light 140 at the blue wavelength, which will be converted into horizontally polarized blue light 142 by the waveplate 132, and then transmitted through the beam splitter 110 into the preamplifier 124 of the receiver 114.

Accordingly, the duplexing function of the disclosed architecture is implemented entirely by controlling the polarizations of the transmitted and received beams, without relying on bandpass filters, in contrast with the more common dichroic approach of implementing the Tx-Rx diplexer using bandpass filter(s). The present approach thereby allows the terminal to be easily switched between receiving "red" and "blue" light simply by reversing the circular polarization direction of the waveplate 132, without affecting precision pointing, and without affecting the co-boresight alignment between transmit and receive. In some embodiments, the direction of circular polarization waveplate can be changed by mechanically rotating the waveplate 132, for example using a stepper motor. In other embodiments, the direction of circular polarization is electrically controlled by implementing a liquid crystal variable retarder (LCVR) as the waveplate 132.

Various embodiments include optical bandpass filter assemblies 116 with out-of-band blocking in the receiver 114 that further minimize entry of any extraneous light (e.g. transmit laser ASE or scattered sunlight) into the tunable optical filter (TOF) 126 that precedes the communications detector 148 of the receive channel 114. In the embodiment of FIG. 1A, the bandpass filter assembly 116 includes a "red" bandpass filter 118 and a "blue" bandpass filter 120 arranged in parallel and configured so that either filter 118, 120 an be inserted into the receiver beam path 128.

Figure 2:
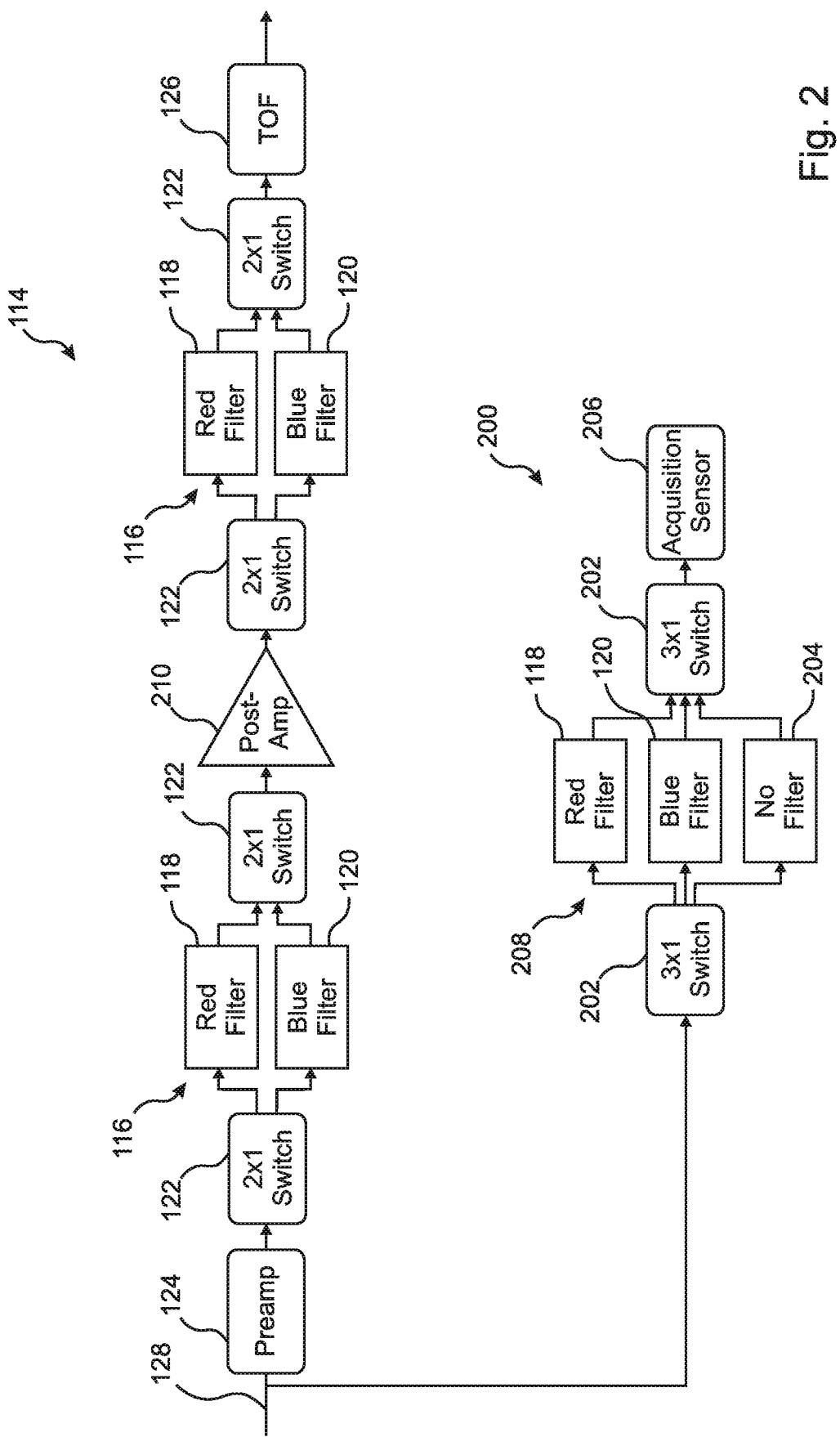
FIG. 2 is a block diagram of a receiver in an embodiment of the present disclosure that includes a spatial acquisition tracking detector wherein 3×1 switches select between red, blue and no-filter channels of a filter assembly.

With reference to FIG. 2, in embodiments the receiver 114 further implements a spatial acquisition tracking module 200 that is used for initial terminal alignment and for navigation. In the embodiment of FIG. 2, the spatial acquisition tracking module 200 includes a spatial acquisition filter assembly 208 that uses 3×1 switches 202 to select between red 118, blue, 120 and "no-filter" 204 channels, wherein the "no-filter" channel 204 allows all light wavelengths to enter the acquisition sensor 206, which in embodiments is a quadrant detector or a pixelated focal plane array. The no-filter channel 204 is useful, for example, when using star light to obtain a celestial navigation fix for the attitude of the terminal.

In embodiments, the filter channels 118, 120, 204 of the bandpass filter assemblies 116, 208 are selectable by physically moving them into and out of the beam paths of the receiver 114, for example via a mechanical switch, via a two-position or three-position tilt rotation, via stepper motor rotation or linear translation, or via bi-static rotary solenoids. In other embodiments, the receiver 114 includes parallel beam paths having red 118 and blue 120 filters respectively, and the received light 128 is switched between the paths using, for example using polarizing beam splitters in combination with liquid crystal variable retarders (LCVRs) to rotate the polarization of beam 128, and thereby to select the desired filter path.

In the embodiment of FIG. 1A, the filters 118, 120 are selectable via a pair of 2×1 switches, and in FIG. 2 the filters 118, 120, 204 in the filter assembly 208 of the spatial acquisition tracking module 200 are selectable via 3×1 switches 202. Similar embodiments implement 2×1 or 3×1 fiber couplers.

In the embodiment of FIG. 2, the communication receive channel includes two filter assemblies 116 with an optical booster amplifier 210 included in between. In embodiments, the optical booster amplifier 210 can be an erbium-doped fiber amplifier (EDFA) or an yttrium-doped fiber amplifier (YDFA).

Figure 3:
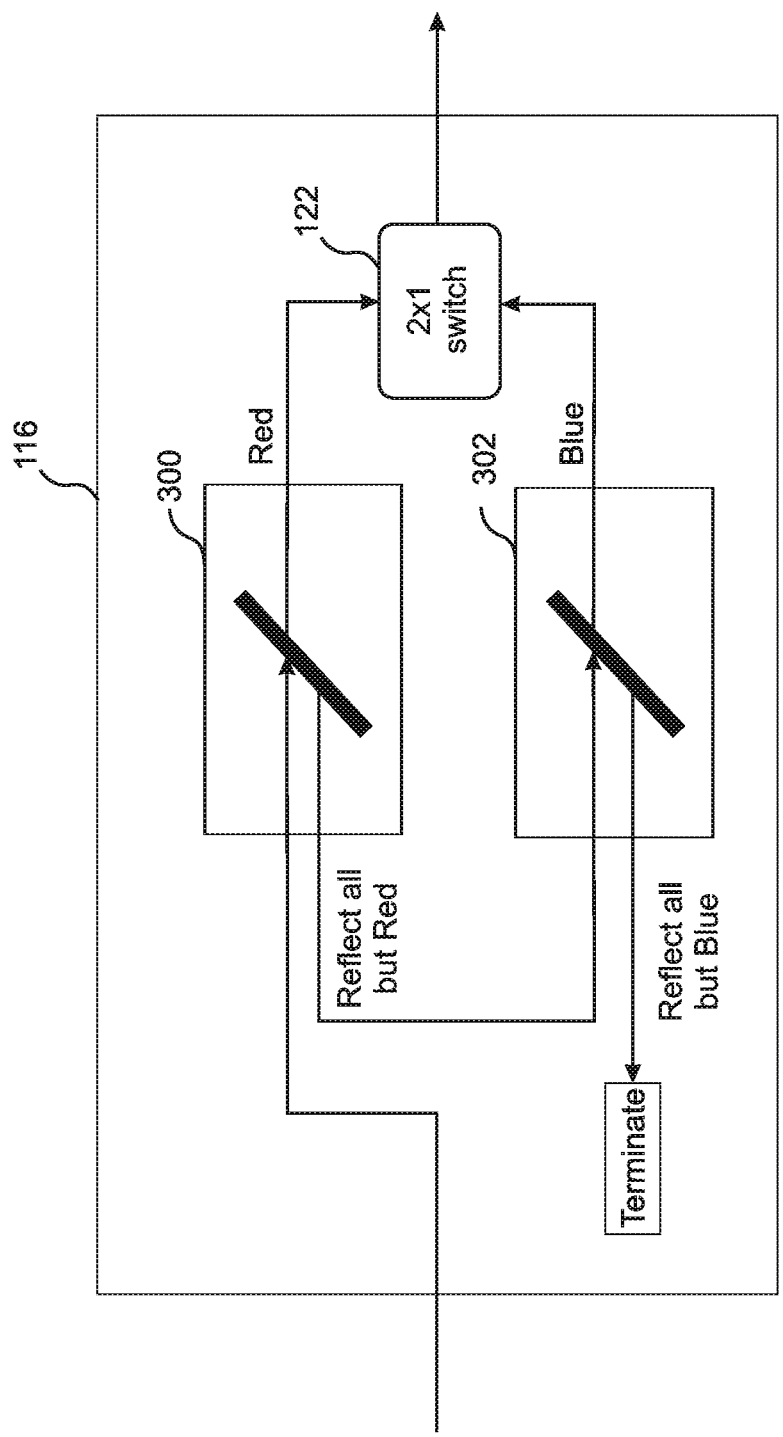
FIG. 3 is a block diagram of a filter assembly that is an alternative to the filter assemblies of FIG. 1A and FIG. 2, wherein a pair of 3-port DWDM fiber-optic filters requires only a single 2×1 optical switch at the output thereof.
Figure 4:
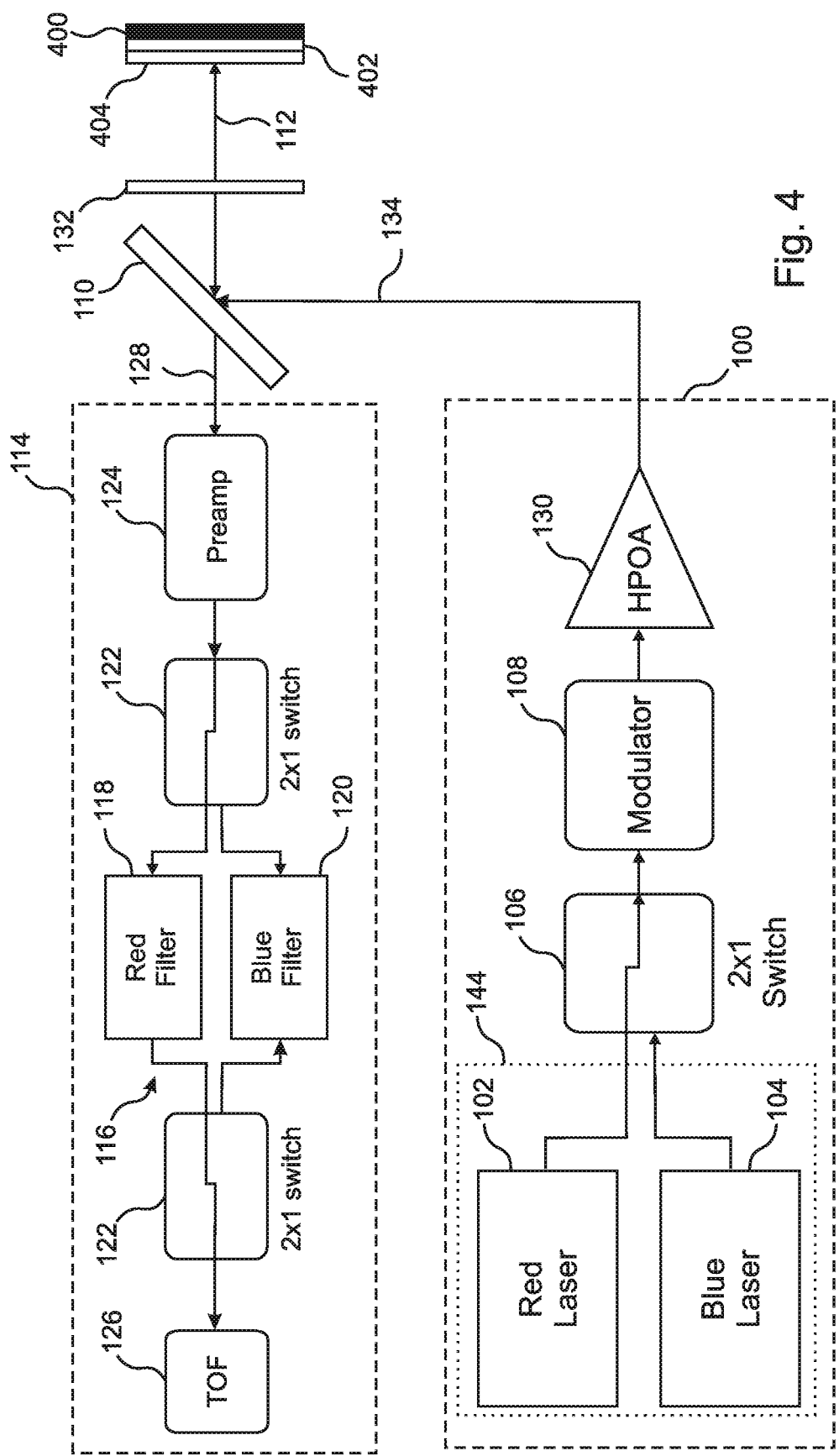
FIG. 4 is a block diagram of an embodiment similar to FIG. 1A further including an external retroreflector shown when performing a self co-boresight alignment.

In still other embodiments, with reference to FIG. 3, the filters are selectable by 3-port DWDM (Dense Wavelength Division Multiplexing) fiber optic filters 300, 302, each of which is configured to transmit only red or only blue light, while reflecting all other wavelengths. In the embodiment of FIG. 3, the output of the filter assembly 116 is selected by a 2×1 switch 122 from between two DWDM's 300, 302.

Figure 5:
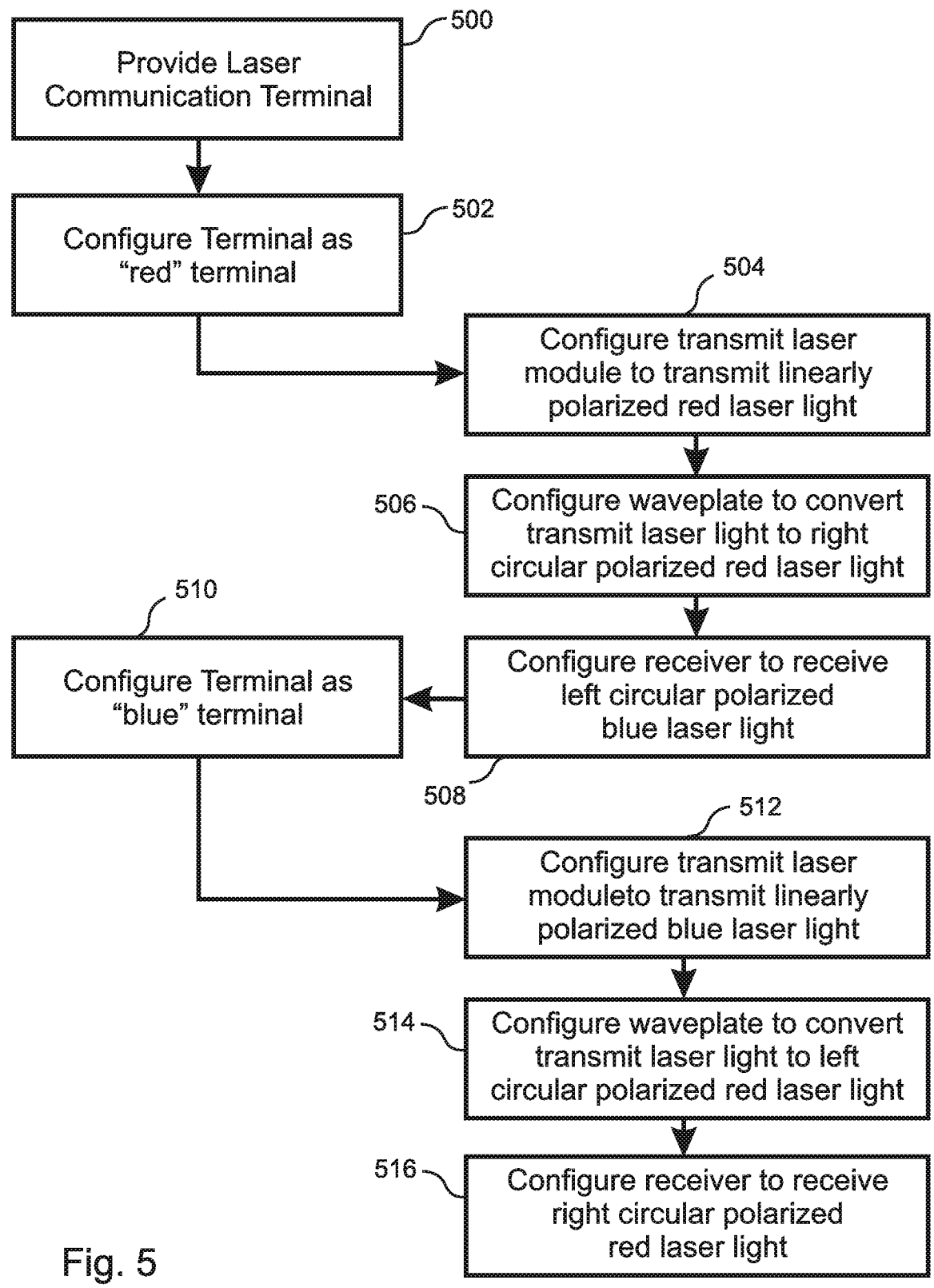
FIG. 5 is a flow diagram illustrating reconfiguration of a laser communication terminal between a red configuration and a blue configuration according to a method embodiment of the present disclosure.

Accordingly, with reference to FIG. 5, the disclosed architecture enables a laser communication terminal 500 to be configured as a "red" terminal 502 by configuring the transmit laser module to emit linearly polarized red laser light 504, configuring the wave plate to convert the linearly polarized red laser light to right circular polarized red laser light 506, and configuring the receiver to receive left circular polarized blue laser light 508. The disclosed architecture further enables a laser communication terminal 500 to be configured as a "blue" terminal 510 by configuring the transmit laser module to emit linearly polarized blue laser light 512, configuring the wave plate to convert the linearly polarized blue laser light to left circular polarized red laser light 514, and configuring the receiver to receive right circular polarized red laser light 516. Of course, the present disclosure can also be implemented by assigning left circular polarization to the red laser light and right circular polarization to the blue laser light. The disclosed laser communication terminal architecture thereby providing greater flexibility in reconfiguring a laser communication network, for example in response to any disruption, such as if one of the nodes should fail due to a malfunction or a malicious attack.

Some embodiments that implement both red 118 and blue 120 lasers in the transmit laser module 144, as shown in FIG. 1A, further implement a self-calibration functionality (not shown) by including an external retroreflector with optional attenuator and/or waveplate attached thereto, whereby when the terminal is configured as a "red" terminal, transmitted light from the blue laser can be retro-reflected into the receiver channel for alignment of the receiver optics, and vice versa. This self-calibration functionality reduces or eliminates the need for a remote node to serve as a calibration source.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

I claim:

1. A laser communication terminal comprising:
   a transmit laser module that is configured to be transitioned between emitting linearly polarized transmit laser light at a first laser wavelength and emitting linearly polarized transmit laser light at a second laser wavelength;
   a communication modulator configured to modulate the transmit laser light so as to encode communication data thereupon;
   a controller, configured during a communication phase to cause the transmit laser light to be emitted by the transmit laser module at the first laser wavelength when the laser communication terminal is in a first terminal configuration, and to cause the transmit laser light to be emitted by the transmit laser module at the second laser wavelength when the laser communication terminal is in a second terminal configuration;
   a receiver configured to receive laser light from a receiving input of the laser communication terminal and to direct the received laser light to a detector; and
   a transmit-receive polarization diplexer comprising:
      a beam splitter having a linear polarization that is oriented so as to direct the linear polarized transmit laser light to a transmitting output of the terminal; and
      a waveplate configured to convert the linear polarized transmit laser light into circularly polarized laser light, the waveplate being configured when the laser communication terminal is in the first terminal configuration to convert the linearly polarized transmit laser light into right circularly polarized transmit laser light, the waveplate being reconfigurable when the laser communication terminal is in the second terminal configuration so as to convert the linearly polarized transmit laser light into left circularly polarized transmit laser light;
      the diplexer being configured to direct the received laser light from the receiving input to the receiver when the received laser light has a circular polarization that is opposite to the circularly polarized transmit laser light.

2. The laser communication terminal of claim 1, wherein the transmit laser module comprises a first laser configured to emit the linearly polarized transmit laser light at the first laser wavelength, and a second laser configured to emit the linearly polarized transmit laser light at the second laser wavelength.

3. The laser communication terminal of claim 2, wherein the linearly polarized transmit laser light emitted by the first and second lasers is directed to first and second inputs respectively of a laser selector, the laser selector being configured during the communication phase to select the linearly polarized transmit laser light from one of its inputs and to direct the selected linearly polarized transmit laser light to the communication modulator.

4. The laser communication terminal of claim 3, wherein the laser selector includes a 2:1 laser switch.

5. The laser communication terminal of claim 2, further comprising a self-calibration functionality that includes an external retroreflector, the self-calibration functionality being configured when the terminal is in the first terminal configuration to enable the linearly polarized transmit laser light from the second laser to be directed through the diplexer and into the receiver, the self-calibration functionality being configured when the terminal is in the second terminal configuration to enable the linearly polarized transmit laser light from the first laser to be directed through the diplexer and into the receiver, the self-calibration functionality thereby enabling mutual co-boresight pointing alignment to of transmit and receive optics of the terminal.

6. The laser communication terminal of claim 1, wherein the transmit laser module comprises a laser that is tunable between the first laser wavelength and the second laser wavelength.

7. The laser communication terminal of claim 1, further comprising a high power optical amplifier (HPOA) configured to amplify the linearly polarized transmit laser light.

8. The laser communication terminal of claim 7, further comprising a transmit optical bandpass filter assembly configured to filter the linearly polarized transmit laser light after it is amplified by the HPOA.

9. The laser communication terminal of claim 1, wherein the waveplate can be mechanically rotated to switch between converting the linearly polarized transmit laser light into right circular polarized transmit laser light and left circular polarized transmit laser light.

10. The laser communication terminal of claim 9, wherein a stepper motor is configured to rotate the waveplate.

11. The laser communication terminal of claim 1, wherein the waveplate is a liquid crystal variable retarder (LCVR) that is configured to be electrically switched between converting the linearly polarized transmit laser light into right circular polarized transmit laser light and left circular polarized transmit laser light.

12. The laser communication terminal of claim 1, wherein the receiver further comprises at least one optical bandpass filter assembly that is switchable between a first filter assembly mode in which the second laser wavelength is able to pass through the filter assembly while other wavelengths are excluded, and a second filter assembly mode in which the first laser wavelength is able to pass through the filter assembly while other wavelengths are excluded.

13. The laser communication terminal of claim 12, wherein the optical bandpass filter assembly includes a first filter channel configured to allow the first laser wavelength to pass through the first filter channel with minimal attenuation while other wavelengths are excluded, and a second filter channel configured to allow the second laser wavelength to pass through the second filter channel with minimal attenuation while other wavelengths are excluded, the first and second filter channels being arranged in parallel and configured so that either filter channel can be inserted into a receiver beam path of the receiver.

14. The laser communication terminal of claim 13, wherein the filter channels of the optical bandpass filter assembly can be inserted into the receiver beam path of the receiver by physically moving them into and out of the beam path of the receiver.

15. The laser communication terminal of claim 13, wherein each of the filter channels of the bandpass filter assembly can be physically moved into and out of the beam path of the receiver by at least one of:
  mechanical switching;
  two-position or three-position tilt rotation;
  rotation or linear translation by a stepper motor; and
  rotation by a bi-static rotary solenoid.

16. The laser communication terminal of claim 13, wherein the first and second filter channels of the bandpass filter assembly can be selected by controlling at least one of:
  a pair of 2×1 switches;
  a pair of 2×1 fiber couplers; and
  a 2×1 switch configured to select a desired output from a pair of 3-port DWDM (Dense Wavelength Division Multiplexing) fiber optic filters.

17. The laser communication terminal of claim 1, wherein the receiver further comprises a spatial acquisition tracking module that implements a spatial acquisition filter assembly, wherein the spatial acquisition filter assembly includes:
  a first acquisition filter channel configured to allow the first laser wavelength to pass through the first acquisition filter channel with minimal attenuation while other wavelengths are excluded;
  a second acquisition filter channel configured to allow the second laser wavelength to pass through the second acquisition filter channel with minimal attenuation while other wavelengths are excluded; and
  a no-filter channel that is configured to allow all light wavelengths to pass therethrough with minimal attenuation.

18. The laser communication terminal of claim 1, wherein the receiver includes two parallel beam paths, which are a first beam path having included therein a first filter configured to allow the first laser wavelength to pass therethrough with minimal attenuation while other wavelengths are excluded, and a second beam path having included therein a second filter configured to allow the second laser wavelength to pass therethrough with minimal attenuation while other wavelengths are excluded.

19. The laser communication node of claim 18, wherein the received light can be switched between the beam paths by at least one of:
  a 2×1 switch;
  a 2×1 fiber coupler; and
  a polarizing beam splitter in combination with an liquid crystal variable retarder (LCVR) configured to direct the received light to a selected beam path according to its polarization.

20. A method of controlling a laser communication terminal, the method comprising:
  providing a laser communication terminal according to claim 1;
  placing the laser communication terminal in the first terminal configuration, whereby linearly polarized transmit laser light is emitted by the transmit laser module at the first laser wavelength, and the waveplate converts the linearly polarized transmit laser light into right circularly polarized transmit light; and
  placing the laser communication terminal in the second terminal configuration, whereby the linearly polarized transmit laser light is emitted by the transmit laser module at the second laser wavelength, and the waveplate converts the linearly polarized transmit laser light into left circularly polarized transmit light.

21. The method of claim 20, wherein:
  the receiver comprises an optical bandpass filter assembly;
  placing the laser communication terminal in the first terminal configuration further comprises configuring the optical bandpass filter assembly to allow light having the second laser wavelength to pass through the optical bandpass filter assembly while other wavelengths are excluded; and
  placing the laser communication terminal in the second terminal configuration further includes configuring the optical bandpass filter assembly to allow light having the first laser wavelength to pass through the optical bandpass filter assembly while other wavelengths are excluded.

* * * * *